June 21, 1927.　　F. E. CRAWFORD　　1,632,787
DIFFERENTIAL
Filed Jan. 3, 1923　　3 Sheets-Sheet 1

WITNESSES
INVENTOR
F. E. Crawford.
BY
ATTORNEYS

June 21, 1927.
F. E. CRAWFORD
1,632,787
DIFFERENTIAL
Filed Jan. 3, 1923
3 Sheets-Sheet 2
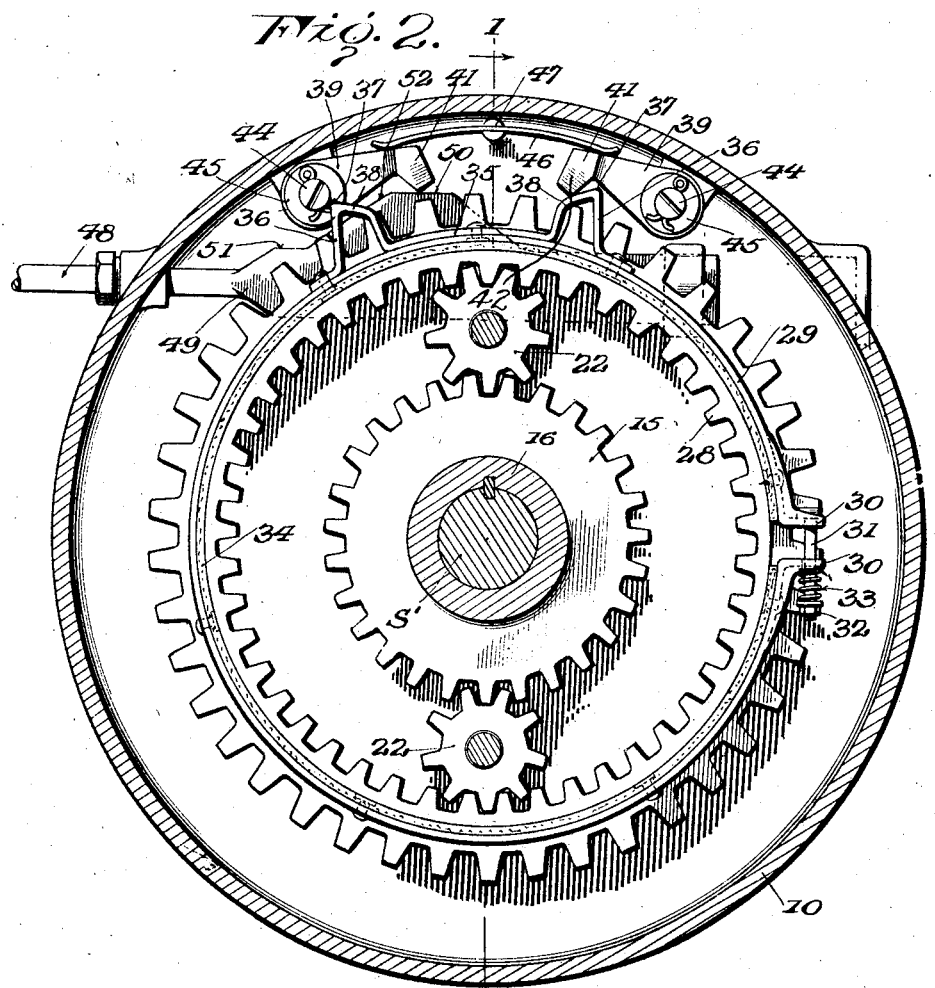
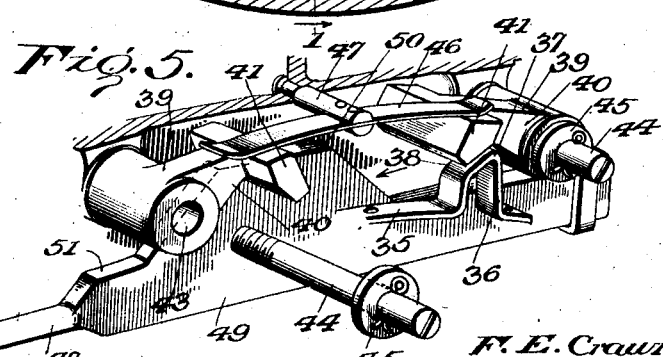
WITNESSES
W. A. Williams
INVENTOR
F. E. Crawford.
BY
ATTORNEYS

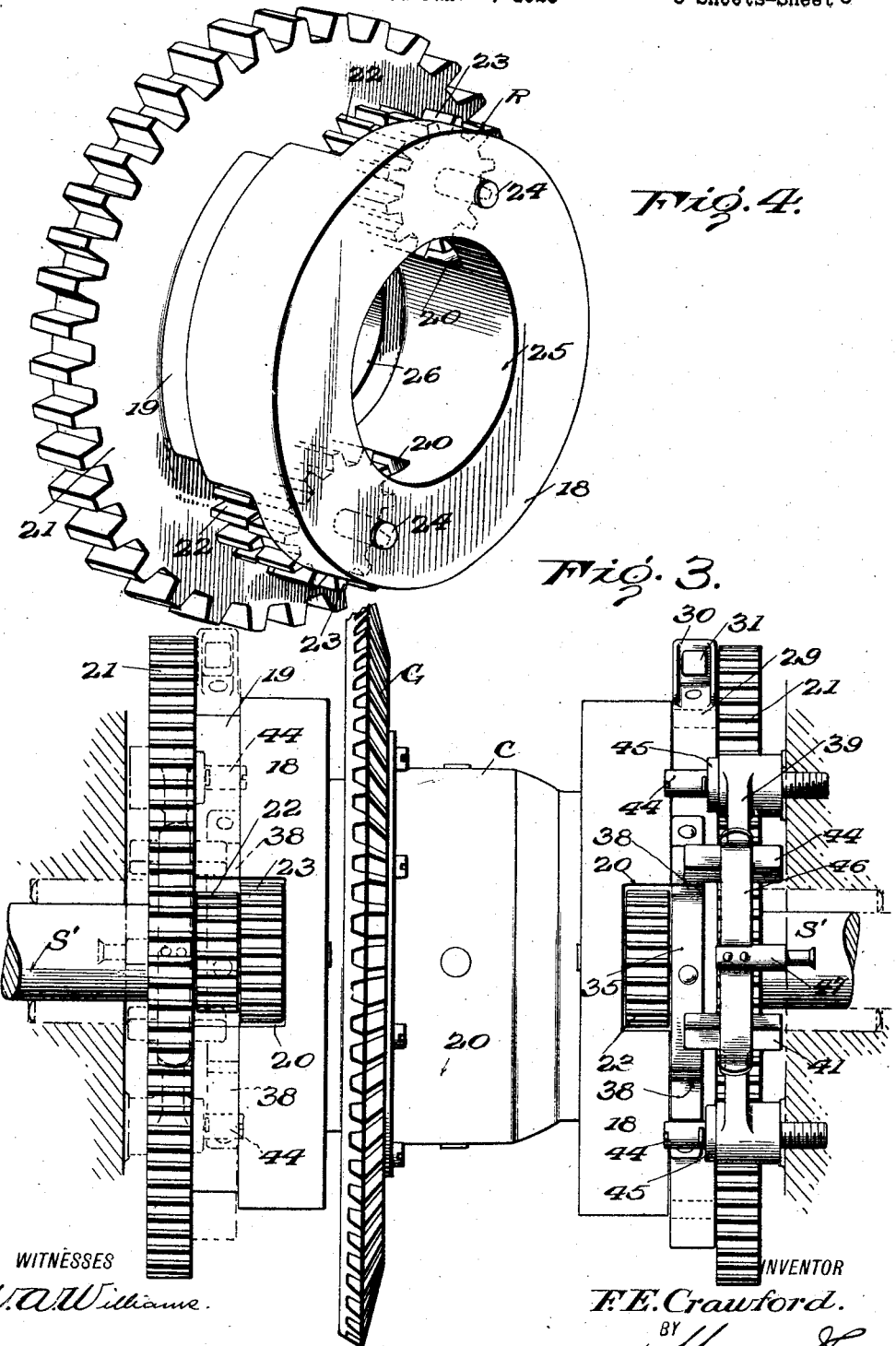

Patented June 21, 1927.

1,632,787

UNITED STATES PATENT OFFICE.

FRANK ELMER CRAWFORD, OF YORK, NEBRASKA.

DIFFERENTIAL.

Application filed January 3, 1923. Serial No. 610,506.

This invention relates to improvements in differentials.

In differential gearing heretofore proposed, complete differentiation is secured or is entirely prevented, there being no means provided whereby differentiation may be only restricted to a predetermined ratio, with the result that, in the former, the power of the engine may be spent in transmitting motion to but one driving wheel. while in the latter manually operable means are temporarily employed to entirely prohibit differentiation thereby giving the effect of a solid axle.

The purpose of my invention is to provide a device which automatically limits the scope of differentiation to a predetermined and necessary ratio.

The greatest amount of differentiation necessary under ordinary conditions is that which allows of the vehicle turning in the smallest circle of which its steering apparatus permits. If, during the turning of this smallest circle with a given car, the inner wheel makes three revolutions while the outer wheel makes five revolutions, then, for this car, the necessary ratio of 3 to 5 is established. For convenience of expression I will employ this ratio. In my present invention means are shown for allowing this maximum differentiation and yet prohibiting any greater ratio, while at the same time either wheel of the vehicle may act anywhere between the ratio of 3 to 5 while the other is compensating from 5 to 3. Differentiation is thus permitted and yet limited, so that motion is at all times provided to both wheels of the motor vehicle.

Other objects and advantages relating to details of construction, combination and arrangement of parts will hereinafter appear in the detailed description to follow.

The invention is illustrated by way of example in the accompanying drawings, in which:—

Figure 2 is a sectional view taken substantially on the lines 2—2 of Figure 1.

Figure 3 is a top plan view of the differential unit when removed from its housing.

Figure 4 is a perspective view of compensating or connecting unit interposed between each axle shaft and associated end of differential gear casing.

Figure 5 is a detail perspective view of the pawls used in connection with each compensating unit controlling the movements of the axle shafts.

Like reference numerals refer to like parts throughout the views of the drawings.

Figure 1:
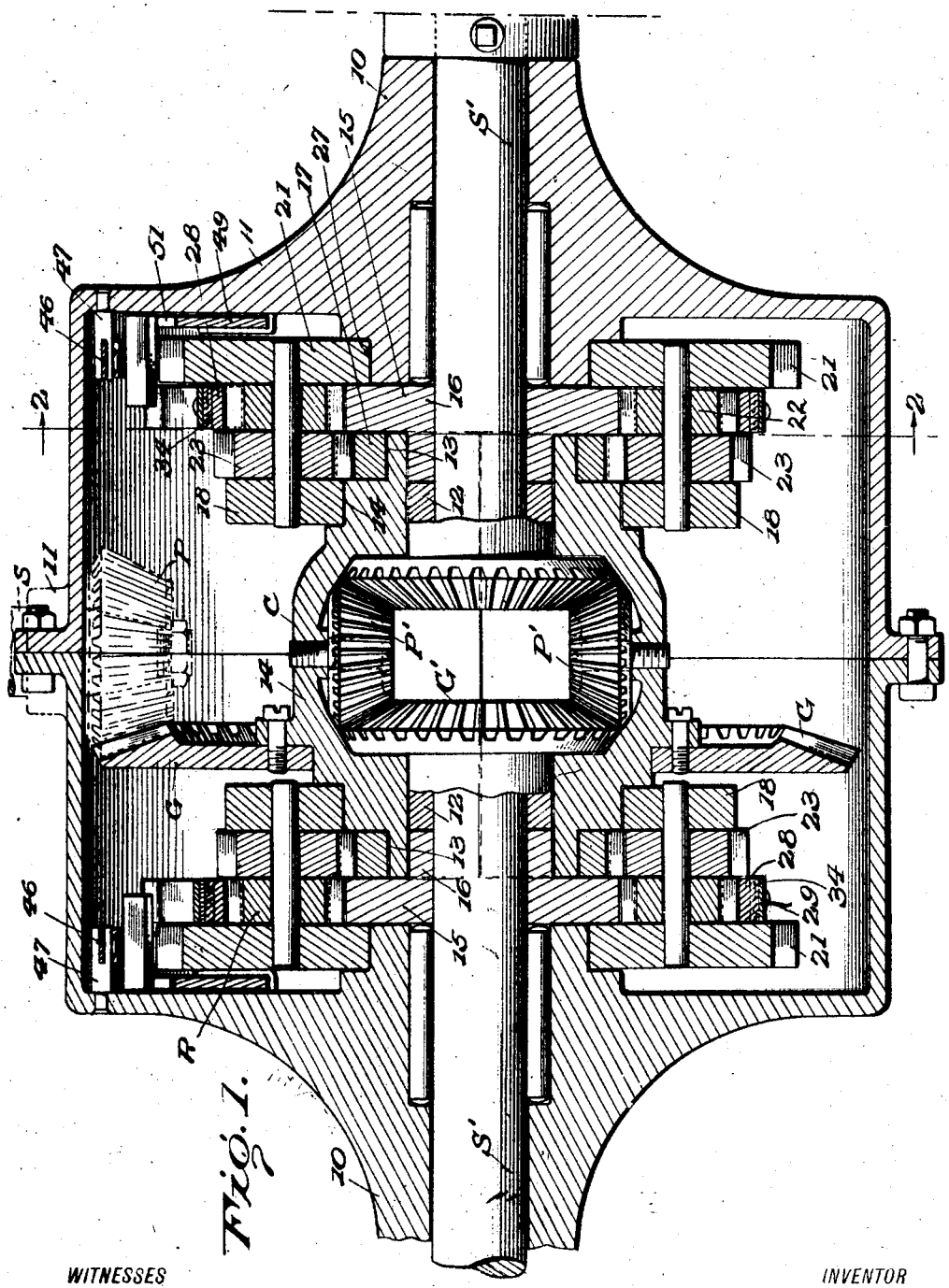
Figure 1 is a sectional view of a differential unit taken on the line 1—1 of Figure 2.

Referring to the drawings more particularly. H indicates generally a differential housing which may be of any desired shape with a view that the same will accommodate the different units of the present differential construction. The housing has the two usual hub portions 10 and is also provided with a suitable bearing as at 11 whereby to support the rear end of the drive shaft generally indicated at S. The drive shaft S carries the usual pinion P which is in constant mesh with the ring gear G carried upon the differential gear casing C. The differential gear casing C may be of sectional formation and support therein in the usual manner the pinions $P^1$ and the gears $G^1$. Each gear $G^1$ is secured upon the inner end of an axle shaft $S^1$ and has an extended hub portion as at 12.

The differential gear casing is provided at each end with an annular offset, the portion 13 of which is preferably octagonal in cross section. A second offset is also provided upon each end of the differential gear casing C, and the bottom portion 14 of which is circular and adapted to present a bearing surface.

Interposed between each end of the differential gear casing C and the associated inner side of the housing H, is a gear 15 which is formed with a hub extension 16 which is adapted to substantially abut the extended hub portion 12 of the associated differential gear $G^1$. The gear 15, in each instance, is splined upon the associated shaft $S^1$. Upon each end of the differential gear casing C there is positioned a gear ring 17, said gear ring being adapted to be seated upon the associated octagonal shaped end portion 13 and thus be rigidly held against turning movement with relation to the casing C.

What may be termed a "ring carrying unit" and generally designated by the reference character R is provided for each shaft $S^1$. The construction of this ring carrying unit is specifically shown in Figure 4 of the drawings and as is seen in this figure comprises an annular member or ring 18 which is formed upon its outer periphery with an annular offset 19, said offset occurring upon the inner edge of the ring. Also upon the inner side of the ring there is provided a pair of recesses 20. The ring 18 is rigidly secured to a cog wheel 21, which functions as a ratchet-wheel, said cog wheel being of greater diameter than the ring 18, as shown. A pair of pinions 22 and 23 respectively, are positioned in each of the recesses 20, and each pair of pinions being rotatably supported by a stub shaft 24. The pinions 22 and 23 are in each instance secured rigidly to the associated stub shaft 24, and the stub shaft 24 has its ends journaled respectively in the cog wheel 21 and the ring 18. The opening 25 of the ring 18 is of such a diameter that the ring may be journaled by the annular offset portion 14 upon the associated end of the casing C, while the opening 26 of the cog wheel 21 is adapted to receive an annular protrusion 27 formed upon the associated inner end of the housing H. The cog wheel 21 is in this manner rotatably supported by the housing H and the ring 18 likewise supported by the gear casing C. This is true with respect to each ring carrier unit R. When each ring carrier unit R is positioned, as illustrated in Figure 1 of the drawings, the pinions 22 are in mesh with the gear 15, while the pinions 23 are in mesh with the gear ring 17.

Within the groove formed by offset 19 on the ring member 18 there is positioned an internal ring gear 28, said ring gear being in mesh with the pinions 22. About this internal ring gear there is positioned a divided band 29 which has each of its ends formed with a lateral projection 30 and said projections being connected by a bolt 31, the bolt 31 being passed through suitable aligned openings in said projections and of the length shown. This bolt carries a nut 32 and interposed between this nut and the associated projection 30 is a coil spring 33. As is obvious the tension of the member 29 upon the internal ring gear 28 may be adjusted by manipulating the nut 32. Suitable friction lining may be positioned upon the inner side of the band 29 as indicated at 34, Figure 1.

Upon the outer periphery of the member 29 there is secured a metal strip 35 which is formed adjacent each of its ends with a protrusion 36 and each protrusion presenting a point 37 and an inclined surface 38, said inclined surfaces 38 extending in opposite directions. For each protrusion 36 there is provided a pawl generally indicated by the reference character 39 and specifically shown in Figure 5 of the drawings. Each of the pawls consist in a shank portion 40 which terminates in a downwardly extending lip 41 which has its lower end bevelled as at 42. The shank portion 40 of each pawl is provided with an opening 43 adapted to receive the one end of a stud 44. The studs 44 are in each instance threaded into the associated end wall of the housing H, and each stud is provided with a collar 45 adapted to limit the inward movement of the associated pawl. A leaf spring 46 is provided for each pair of pawls 39, said leaf spring in each instance being rigidly supported at a point intermediate its ends as at 47 from suitable means extending from the housing H, and the ends of said leaf spring being adapted to engage upon the opposing ends of the associated pawls 39 and depress said pawls downwardly.

A slide bar 48 is extended through a suitable slot in the housing H and terminating at its inner end in a head 49, said head presenting upon its upper edge the two substantially horizontal surfaces 50 and 51 and an intermediate inclined surface 52.

The forward end of the slide 48 may be connected with the gear mechanism of the associated motor vehicle in such a manner that upon the gear shifting lever being brought to a position for any of the forward movements of the motor vehicle, the head 49 of the slide 48 will be positioned as in Figure 2 of the drawings. It is of course apparent that this slide may be manually manipulated if so desired and not connected with the gear shifting lever. When the gear shifting lever of the motor vehicle is positioned for reverse drive, then the slide 48, to accomplish the results of the present invention should be shifted so that its head will be positioned beneath the rearmost pawl 39 and its inclined surface 52 engaging the rearmost pawl 39 for lifting the same. It should be further noted that two operating slides 48 must be provided in order to operate the two sets of pawls 39, and the manner in which these slides function with respect to the pawls 39 will be clearly described in the description to follow.

The operation of the present apparatus is as follows: Assuming that the vehicle with which the present differential is cooperated is driving in a straight and forward direction, then power is transmitted from the drive shaft S to the axle shafts $S^1$ in equal ratio and in the usual manner. While each rear wheel of the motor vehicle is turning at the same rate of speed the ratio of the gears 17 and 15 for driving the pinions 22 and 23 is such that the "ring carrier unit", in each instance, will rotate at a rate equal to that of the wheels and also that of the differential gear casing. Now should either one of the axle shafts $S^1$ be reduced in speed to the ratio of 3, while the other has increased to the ratio of 5, then the "ring carrier unit" associated with the axle making the lesser number of revolutions will come to a stop and should the tendency of the rear wheels be to increase this ratio of differentiation, then the tendency of the "ring carrier unit" R associated with the shaft axle making the lesser number of revolutions will be to turn backward. Referring to Figure 2 it will be seen, that the split ring 29 cannot rotate in a left hand direction, due to the fact, that its forward protrusion 36 engages the forward pawl carrying stud 44. This is true with respect to each ring carrying unit. The rearmost pawl of each unit is elevated and rests upon the inclined surface 38 of the associated projection 36 and is so held by the tension of the spring 46. Now upon the "ring carrier" attempting to turn in the opposite direction, the friction member 29 will be carried therewith and will continue in such a movement until the rearmost pawl 39 engages the teeth of the cog wheel 21 and brings the same to a stop. Upon this occurring the gear casing C will transmit its motion through the pinions 22 and 23 to the gear 15 which in turn will transmit the motion to the associated axle shaft $S^1$ and thereby bring this shaft to rotate within the proper rate of speed which represents the lowest speed of the one axle shaft with respect to the other in the present differential construction.

Upon the axle shafts again returning to their normal differentiation, that is, within the ratio of 3 to 5, the brake ring 29 will return to its original position as shown in Figure 2 and thus the ring carrier R will again function in its original manner.

The description heretofore given relative to the operation of one ring carrier unit is also true with relation to the other and thus it becomes obvious that by this arrangement, the differentiation of the two axle shafts $S^1$ may be held within the ratio of 3 to 5 as intended. It also may be here stated that the ratio may be changed by changing the construction of the gears 15, 17, 22 and 23.

In case that this particular ratio of differentiation is desired when the vehicle is moving in a rearward direction, then the levers 48 as heretofore stated are moved so that they engage with the rearmost pawls 39. The operation for maintaining this differentiation upon rearward movement of the vehicle is the same as that heretofore described for forward movement of the vehicle with the exception that the pawls 39 operate in an exact reverse manner.

It should be here noted that with my invention in case one of the driving spindles or axles should break the motor vehicle may proceed by delivering power to one drive wheel through the unbroken spindle. This is entirely obvious from the construction heretofore described. Furthermore, in a case of this kind the power is increased on the wheel having traction as through a gear transmission. It is also important to note that in case the operator of the motor vehicle was unable to apply power to the differential through breakage of the drive shaft, or stops of the engine, or the like and was ascending a steep grade, the present invention would operate to positively prevent the motor vehicle from running backwards. This would be due to the fact that the pawl 39 would come into engagement with the ring gear 21 and lock the same against turning movement. The locking of this ring gear would in turn lock the associated pinions 22 and 23 and thus lock the spindles $S^1$.

While I have shown and described the preferred form of my invention, I wish it to be understood that I am aware of the fact, that the construction, combination and arrangement of parts may be changed by those skilled in the art without departing from the spirit of the invention, as indicated by the appended claims.

What I claim is:

1. A differential unit including a rotative differential gear casing and a pair of spindles driven thereby in combination, connecting means comprising a rotative reducing gear carrier and reducing gears rotatively mounted in said carriers between each spindle and said rotative differential gear casing whereby the rotative movement of either spindle in one direction may be maintained within a predetermined degree with respect to the rotational speed of said differential gear casing, means to lock said carriers against reverse rotation, and means operable from a remote point to permit rotation of said carrier in said reverse direction and to lock it against other rotation, whereby the connecting means between each spindle and differential gear casing may be caused to operate for maintaining the rotative relation between said gear casing and spindles when said spindles are rotated in the opposite direction.

2. In combination, a motor vehicle, a differential unit therefor including a rotative differential gear casing and a pair of spindles, one for each of the rear wheels of said motor vehicle, in combination, connecting means comprising rotative carriers and reducing gears rotatively mounted in said carriers, between each spindle and the rotative differential gear casing whereby the rotation of either spindle may be maintained within a predetermined degree of the rotation of said rotative differential gear casing during any forward movement of said motor vehicle, means to lock said carriers against reverse rotation, and means operable from a remote point to permit rotation of said carrier in said reverse direction and to lock it against other rotation, whereby the connecting means between each spindle and said rotative differential gear casing may be adjusted to cause a like rotational relation between said spindles and said rotative differential gear casing upon any rearward movement of said motor vehicle.

3. In a differential unit including a rotative differential gear casing, a pair of spindles driven by said differential unit, a control unit for each spindle consisting in a gear fixed upon the gear casing of the differential unit, a gear fixed upon the spindle, a carrier rotatable about said gears, connecting means between said carrier and the gears whereby the carrier will rotate in a certain direction as long as the spindle maintains a predetermined speed of rotation with relation to the gear casing, said connecting means being also adapted to cause the carrier to reverse its direction of rotation upon the rotation of the spindle falling below this predetermined degree, means whereby the carrier may be held against reverse rotation, and power may be transmitted from the gear casing to said spindle during the interval said carrier is held against reverse rotation.

4. In a differential unit including a rotative differential gear casing, a pair of spindles driven by said unit, a control unit for each spindle consisting in a gear fixed upon the spindle, a gear fixed upon the gear casing of the differential unit, a pair of pinions, a carrier adapted to support said pinions for rotation about said gears and to permit one of said pinions to be in constant mesh with the gear upon the gear casing and the other pinion in constant mesh with the gear upon the spindle, said gear and pinions being of such a ratio that the same will rotate the carrier about the spindle in one direction as long as the speed of rotation of the spindle does not decrease beyond a predetermined degree with respect to the speed of the gear casing, and upon this spindle decreasing in speed a predetermined amount, said pinions operating to rotate the carrier in a reverse direction, means whereby said carrier may be held against reverse rotation and thereby causing the power to be transmitted through said pinions and gears from the gear casing to said spindle.

5. In a differential unit including a rotative differential gear casing, a pair of spindles driven by said unit, a control unit for each spindle consisting in a gear fixed upon the spindle, a gear fixed upon the gear casing of the differential unit, a pair of pinions, a carrier adapted to support said pinions for rotation about said gears and to permit one of said pinions to be in constant mesh with the gear upon the gear casing and the other pinion in constant mesh with the gear upon the spindle, said gear and pinions being of such a ratio that the same will rotate the carrier about the spindle in one direction as long as the speed of rotation of the spindle does not decrease beyond a predetermined degree with respect to the speed of the gear casing, and upon this spindle decreasing in speed a predetermined amount, said pinions operating to rotate the carrier in a reverse direction, and automatic operating means adapted to lock the carrier against reverse rotation.

6. In a differential unit including a rotative differential gear casing, a pair of spindles driven by said unit, a control unit for each spindle consisting in a gear fixed upon the spindle, a gear fixed upon the gear casing of the differential unit, a pair of pinions, a carrier adapted to support said pinions for rotation about said gears and to permit one of said pinions to be in constant mesh with the gear upon the gear casing and the other pinion in constant mesh with the gear upon the spindle, said gear and pinions being of such a ratio that the same will rotate the carrier about the spindle in one direction as long as the speed of rotation of the spindle does not decrease beyond a predetermined degree with respect to the speed of the gear casing, and upon this spindle decreasing in speed a predetermined amount, said pinions operating to rotate the carrier in a reverse direction, an internal ring gear in mesh with one of said pinions and adapted to permit said pinion to track thereon when said carrier is rotated, and means associated with said internal ring gear whereby with the carrier tending to rotate in the opposite direction, the same will be locked against this movement and thereby causing the pinions and gears to transmit power from the gear casing to said spindle.

7. In a differential unit including a rotative differential gear casing, a pair of spindles driven by said unit, a control unit for each spindle consisting in a gear fixed upon the spindle, a gear fixed upon the gear casing of the differential unit, a pair of pinions, a carrier adapted to support said pinions for rotation about said gears and to permit one of said pinions to be in constant mesh with the gear upon the gear casing and the other pinion in constant mesh with the gear upon the spindle, said gear and pinions being of such a ratio that the same will rotate the carrier about the spindle in one direction as long as the speed of rotation of the spindle does not decrease beyond a predetermined degree with respect to the speed of the gear casing, and upon this spindle decreasing in speed a predetermined amount, said pinions operating to rotate the carrier in a reverse direction, an internal ring gear in mesh with one of said pinions and adapted to permit said pinion to track thereon when said carrier is rotated, a friction band about said internal gear ring, means to limit the rotation of said friction band in both directions, and means operable by the last named means whereby upon the carrier rotating in a reverse direction, the same will be locked against this movement and thereby causing the power to be transmitted from the gear casing through said inter-meshing pinions and gears to said spindle.

8. In combination, a pair of spindles, a differential operatively connected with the spindles, said differential including a rotative casing, a rotative carrier, means to prevent reverse rotation thereof, and reduction gearing rotatively mounted in said carrier, between said rotative casing and each spindle for positively driving the slower moving spindle from the rotative casing at a rate of speed less than that of the casing when the ratio of differentiation reaches a predetermined degree.

9. In combination, a pair of spindles, a rotative differential gear casing, differential gears in said casing, operatively connected with said spindles, gears on said casing and on said spindles and motion transmission means comprising a rotative carrier, means to prevent reverse rotation thereof, and reducing gears rotatively mounted in said carrier between the gears on said differential casing and on each spindle and independent of the mechanism of the differential gears in said casing, for positively driving the slower moving spindle from the differential gear casing when the ratio of differentiation reaches a predetermined degree.

10. In combination, a pair of spindles, a differential operatively connected with the spindles, said differential including a rotative casing, a rotative carrier, means to prevent reverse rotation of said carrier, a set of gearing rotatively mounted in said carrier between the rotative casing and each spindle for positively driving the slower moving spindle from the rotative casing at a rate of speed less than that of the said casing when the ratio of differentiation reaches a predetermined degree, each set of gearing also serving to prevent movement of the spindle with which it is associated in a direction opposite to that to which said casing is moved.

11. In combination, a housing, a pair of spindles rotatably mounted in the housing, a differential within the housing and operatively connected with the spindles, said differential including a rotative casing, a set of reduction gearing between the rotative casing and each spindle, each set of reduction gearing including a rotatable carrier, a rotatable shaft mounted on the carrier, a pair of pinions fixed to said shaft, a gear fixedly connected to the rotative casing and meshed with one of said pinions, a gear fixedly connected to the adjacent spindle and meshed with the other pinion, and cooperating means between the housing and the carrier for holding the carrier against movement in a direction opposite to that of the direction of movement of the rotative casing.

12. In combination, a pair of spindles, a differential operatively connected with said spindles and including a rotative casing, a set of gearing between the rotative casing and each spindle, each set of gearing including a rotatable carrier, a rotatable shaft mounted on the carrier, a pair of pinions fixed to said shaft, a gear fixedly connected to the rotative casing and meshed with one of said pinions, a gear fixedly connected to the adjacent spindle and meshed with the other pinion, and means for holding the carrier against rotation when the ratio of differentiation reaches a predetermined degree.

13. In combination, a pair of spindles, a differential operatively connected with said spindles, a rotative carrier, means to prevent reverse rotation thereof and a separate set of normally inactive speed reduction gearing rotatively mounted on said carrier, between the differential and each spindle, each set of speed reduction gearing being independent of the mechanism of the differential.

14. In combination, a pair of spindles, a differential including a rotative gear case, operatively connected with said spindles, a rotative carrier, means to prevent reverse rotation of said carrier, and means, comprising gears rotatively mounted in said carrier, gears mounted on said gear case and gears mounted on said spindles, and independent of the mechanism of said differential for positively driving the spindles when the ratio of differentiation reaches a predetermined degree.

15. In combination with a differential including a rotative differential gear casing and driven differential members, gears operatively associated with said casing and with said driven members, respectively, a pair of rotative carriers, means to prevent reverse rotation of said carriers, reducing gears rotatively mounted in said carriers and operatively associated with said first named gears, for positively driving one of said driven members from the reducing gears in one of said carriers when the ratio of differentiation between said driven members reaches a predetermined degree.

16. A differential unit including a rotatively mounted differential gear casing, differential gears in said casing, rotatively mounted carriers, means to prevent reverse rotation of said carriers, and reducing gears rotatively mounted in said carriers, and spindles driven by said differential gears, in combination with connecting means between said differential and said reducing gears and between said spindles and the reducing gears, whereby the speed of rotation at which said spindles are driven will be maintained within a predetermined ratio by said reducing gears.

17. A differential unit including a rotatively driven differential gear casing, a pair of spindles controlled thereby, and rotative carriers, reducing gears rotatively mounted in said carriers, and means to prevent reverse rotation of said carriers, in combination, connecting means between each spindle and said gear casing, between said carriers and said casing and between said spindles and said reducing gears, whereby the rotative movement of either spindle in one direction may be maintained less than and within a predetermined degree with respect to the rotational speed of said differential gear casing, and means operable from a remote point whereby the connecting means between each spindle and said differential gear casing and between each spindle and said carriers may be caused to operate for maintaining the rotative relation between said casing, spindles and carrier when rotated in opposite direction.

18. In a differential unit including a rotatively mounted differential gear casing, differential gears in said casing, a pair of spindles driven by said gears, a control unit for each spindle consisting in a gear fixed upon said casing, a gear fixed upon the respective spindles, carriers rotative about said spindles, reducing gears rotatively mounted on said carriers, connecting means between said reducing gears and said casing, and between said reducing gears and said spindles, whereby the carrier will rotate in a certain direction as long as the spindles maintain a predetermined ratio of rotation, said connecting means being also adapted to force said carrier to reverse its direction of rotation upon the rotation of the spindles falling below said determined ratio, means whereby the carrier is held against reverse rotation, whereby power may be transmitted from the gear casing to one of said spindles during the interval said carrier is held against reverse rotation.

19. A differential unit including a rotatively mounted differential gear casing, a pair of rotatively mounted carriers, reducing gears rotatively mounted in said carriers, and a pair of spindles, means to prevent reverse rotation of said carriers, in combination with connecting means between said spindles and said gear casing, connecting means between said spindles and said reducing gears, and connecting means between said reducing gears and said casing, whereby the rotation of either spindle is maintained in the same direction within a predetermined degree of the rotation of said casing during any forward movement of said casing.

20. A pair of spindles, a differential operatively connected with said spindles, rotative carriers, gears rotatively mounted on said carriers and operatively connected with said differential and with said spindles, in combination with automatically operable means for maintaining said carriers against reverse rotation, whereby when said gears act in certain relation said differential functions and when said action in said relation ceases said rotative carriers function to positively drive said spindles.

21. A driving device for a pair of spindles including gears on said spindles, a rotative differential gear case, planetary gears in said gear case arranged to drive the spindles to permit a differential movement thereof, in combination with additional gears on said spindles, rotative carriers, means to hold said carriers against reverse rotation, gears on said gear case and gears rotatively mounted on said carriers connecting said carriers to said gear case and to said additional gears to positively drive said spindles when a determined differential ratio between said spindles is obtained.

22. A driving device for a pair of spindles comprising a rotative differential gear case, gears rigidly mounted on said gear case, gears rigidly mounted on said spindles, a rotative carrier, reducing gear pinions rotatably mounted on said carrier and connecting said gears on said gear case and said gears on said spindles, means to hold said carrier against rotation in a determined direction, for positively driving the said spindles upon a limited amount of differential movement between said spindles being attained.

23. In combination, a pair of spindles, a rotative differential gear casing, rotative gear carriers, differential gears in said casing operatively connected with said spindles, gears rigidly mounted on said casing and additional gears rigidly mounted on said spindles, means to prevent reverse rotation of said carriers, reducing gears rotatively mounted in said carriers between said gears on said casing and said additional gears on said spindles, all arranged to positively drive the slower rotating one of said spindles from one of said gears on said casing when the ratio of differentiation between the spindles reaches a predetermined degree.

24. In combination, a pair of spindles, a rotative differential gear case, differential gears in said case, operatively connected with said spindles, gears mounted on said case and gears mounted on said spindles, motion transmission means between said gears on said case and on said spindles, and means to prevent reverse rotation of said transmission means, whereby said case is the source of power for positively driving the slower rotating one of said spindles when the ratio of differentiation between the spindles reaches a predetermined degree.

FRANK ELMER CRAWFORD.